United States Patent [19]

Davidson

[11] 4,270,401

[45] Jun. 2, 1981

[54] GEAR TEETH

[76] Inventor: Robert Davidson, Hadlow No. 4, R.D., Timaru, New Zealand

[21] Appl. No.: 941,788

[22] Filed: Sep. 12, 1978

[30] Foreign Application Priority Data

Sep. 16, 1977 [NZ] New Zealand .................. 185199

[51] Int. Cl.³ .................. F16H 55/08; F16H 1/28
[52] U.S. Cl. .................. 74/462; 74/800
[58] Field of Search .................. 407/20, 26; 74/457, 74/462, 60, 410, 438, 800

[56] References Cited

U.S. PATENT DOCUMENTS 3,895,540   7/1975   Davidson .................. 74/800

Primary Examiner—C. J. Husar
Assistant Examiner—Conrad Berman
Attorney, Agent, or Firm—Toren, McGeady and Stanger

[57] ABSTRACT

A gear tooth, particularly for internal gears, such as a wobble gear transmission, has its angle of slew defined as a fraction of the radii of the pitch circles of a gear bearing the tooth and a gear adopted to engage with it. The critical factor in calculating the correct profile for a circular-arc gear tooth is $(1-\cos\theta)$ where $\cos\theta = r/R$ and r and R are the radii of the above pitch circles.

5 Claims, 3 Drawing Figures

GEAR TEETH

FIELD OF THE INVENTION

This invention relates to teeth for gears and has particular but not exclusive application to internal gears, that is, gears in which the pitch circle of a pinion is inside the pitch circle of a wheel. In this specification and the claims the term "internal gears" includes also a wobble gear transmission as described, for example, in my U.S. Pat. No. 3,895,540. In this transmission, the stator or wobbling gear acts as a wheel surrounding the rotating gear.

BRIEF DESCRIPTION OF THE PRIOR ART

In wobble gear transmission, and in other types of internal gears in which the pitch circle of the pinion is not markedly smaller than that of the wheel, it is necessary to maintain the engagement of the teeth of the gears over an extended period which may approach 180 degrees. Advantageously, this extended contact period should be used to extend the effective driving engagement of the gears to enable relatively compact gears to transmit high torque, and for the sake of economy, low wear, compactness, and, particularly, suitability for wobble gear transmissions, it is desirable to use a tooth form which provides the maximum rolling contact and the smallest possible pressure angle. Wobble drive transmissions, in particular, require rolling contact and a smaller pressure angle than is practicable with conventional involute or cycloidal teeth. I have found that, under high load, involute teeth can actually force the gears of a wobble gear transmission out of effective engagement. The object of this invention is to provide a tooth form which is more suitable for internal gears in general, and the wobble gear transmission in particular, than the involute and cycloidal forms.

SUMMARY OF THE INVENTION

My invention provides a tooth form of circular-arc or straight-sided profile in which the shape of the profile is determined by functions of a stated factor derived from the speed change ratio of a given pair of gears. The teeth thus provided are adapted to particular speed change ratios calculated in advance.

DETAILED DESCRIPTION OF THE PREFERRED EMBODIMENTS

Since, in theory, circular-arc profiles should best approach pure rolling contact in the type of extended tooth engagement which is possible in internal gears, I have investigated the properties of such profiles in relation, particularly, to the wobble gear transmission. My investigation has shown that the critical factor in calculating the correct profile for a circular-arc gear tooth is $(1-\cos\theta)$ where $\cos\theta = r/R$ and r and R are the radii of the pitch circles, respectively, of the pinion and wheel of a pair of gears.

When applied to a wobble gear transmission, the term "pitch circle" indicates for each gear the circle described on that gear by the rotating point of driving contact between the gears. In wobble gears, r is herein used to indicate the radius of such circle on the non-wobbling gear, and R is herein used to indicate the radius of such circle on the wobbling gear. The radii of the "pitch circles" of wobbling gears related to the speed transmission ratio of the gears in a more complex way than the pitch circles of conventional gears, the details of such relationship being outside the scope of this specification.

Figure 1:
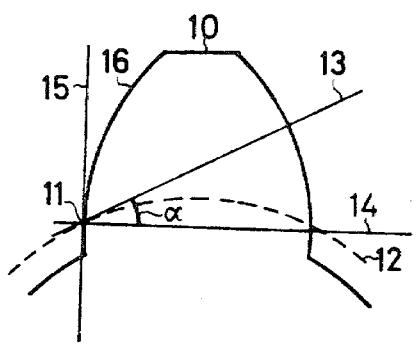
FIG. 1: is a transverse section through a gear tooth showing the angle of slew.

In FIG. 1, a tooth 10 is intersected at a point 11 by the pitch circle of its gear. By "angle of slew" I mean the angle $\alpha$ between a tangent 13 to the pitch circle at the point 11 and a line 14 which is perpendicular at the point 11 to a tangent 15 to the face 16 of the tooth. In the manufacture of gear teeth using a horizontal overarm milling machine, the angle $\alpha$ is the angle to which the dividing head is set or slewed on the table of the machine. Since the same angle is also found between the line 15 and a radius of the gear through the point 11, the angle of slew can also be treated as the pressure angle of the teeth made according to this invention.

I have discovered that the angle of slew for circular-arc and straight-sided teeth should be a function of $\cos\theta$. For practical purposes, the angle of slew on a horizontal overarm milling machine may be selected such that $\sin\alpha = (1-\cos\theta)$. As the difference between r and R increases progressive addition of up to about $\frac{1}{2}°$ may be made to the true value of $\theta$ in calculating the value of $\alpha$ in order to compensate for any error present in the setting up of the machine. In a typical wobble gear transmission of 10 centimeters diameter where $\theta = 12.5°$, the setting of the angle of slew such that $\sin\alpha = (1-\cos\theta)$ produces an error of only a few hundredths of a micron in the profile of a tooth.

Figure 2:
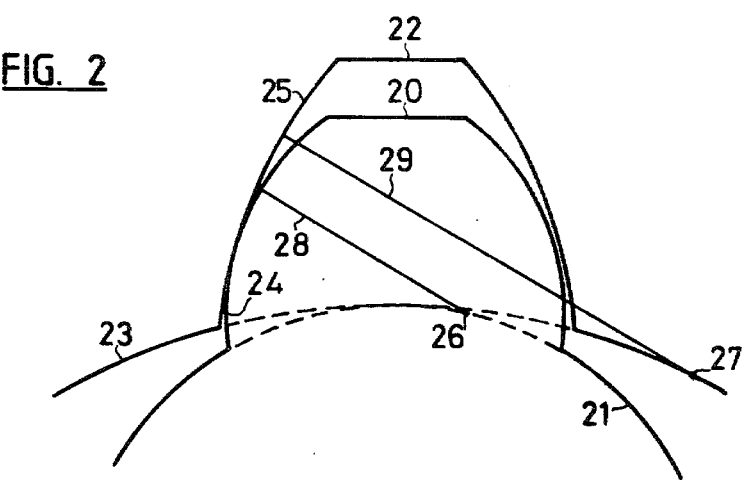
FIG. 2: is a transverse section through a pinion gear tooth in engagement with wheel gear teeth according to the invention.

FIG. 2 shows the practical effect of setting the angle of slew as described when making an intermeshing circular-arc tooth 20 on a pinion 21, and a concave circular-arc root portion 22 in a wheel 23. The convex tooth 20 is substantially all addendum, and the concave root portion 22 is substantially all dedendum. The active faces, e.g. 24, 25, of the tooth 20 and root portion 22 are circular arcs each having its centre of curvature, e.g. 26, 27, on the pitch circle of its respective gear. The radii of curvature, e.g. 28, 29, of the circular arcs are also functions of $\cos\theta$, and those produced by setting the angle of slew to the described value are, for the pinion $r'(1-\cos\theta)$, and for the wheel $R'(1-\cos\theta)$ where $r'$ and $R'$ are, for spur gears, equal to r and R respectively, and, for the wobble gear transmission, the products of the actual physical radii of the rotating and the wobbling gear respectively at the point of cutting of the tooth, and the factor $(\sin\theta/1-\cos\theta)$. In the case of the wobble gear transmission, the physical radius at the point of cutting must be taken into account because the teeth are formed radially on a face of the gear and as their distance from the centre of the gear increases the width of the teeth and the radii of curvature of the circular-arc faces must also increase. These values for the radii of curvature may be built into the hob for cutting gears on a specialist gear-cutting machine.

Because the centre of curvature of an active face of a tooth constructed according to the invention lies on the pitch circle, a line which is perpendicular to a tangent to the face of the tooth must necessarily be a radius of that face. The angle of slew is, therefore, the angle of intersection of such radius and a tangent to the pitch circle at the point of intersection of the pitch circle by that radius. In the case of wobble gears, the pitch circle is taken as cutting the points of driving contact between the teeth. In practice, it is preferred that the teeth of wobble gears be all addendum and dedendum similar to the teeth shown in FIG. 2, the angle of slew therefore being taken at the surface of a gear with concave teeth and at the bases of the teeth of a gear with convex teeth. In FIG. 2 the angle of slew of the convex tooth 20 is shown as $\alpha_1$ and the angle of slew of the root portion 22 is shown as $\alpha_2$.

Although a straight-sided tooth on a finite pitch circle is theoretically inferior to a curved tooth, I have found that the principles I have applied to curved teeth are applicable to the manufacture of straight-sided teeth which perform adequately in many applications, and possess substantial advantages of cost and ease of production.

Figure 3:
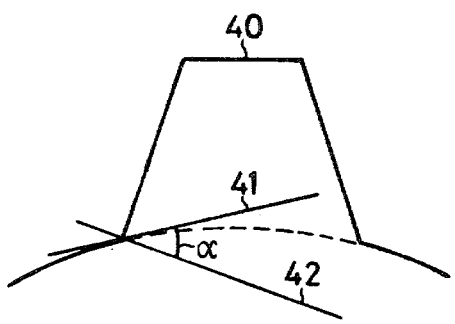
FIG. 3: is a transverse section through a straight-sided tooth according to the invention.

In FIG. 3, a straight-sided tooth 40 incorporates an angle of slew $\alpha$ formed between a tangent 41 to the pitch circle 43 and a perpendicular 42 to the flat face of the tooth. The angle of slew $\alpha$ is such that $\sin \alpha = (1 - \cos \theta)$ and the depth of the tooth is $R'(1 - \cos \theta \cdot \cos \alpha - \sin \theta \cdot \sin \alpha)$. The minimum widths of the tip of a pinion tooth and the base of a wheel tooth are, respectively, $r'(1 - \cos \theta)^2$ and $R'(1 - \cos \theta)^2$.

In the following claims, references to the pitch circles of gears include the theoretical pitch circles in wobble gear transmissions which are calculated as $r/R = \cos \theta$ as hereinbefore defined.

I claim:

1. A gear assembly comprising a first gear and a second gear surrounding said first gear in meshed engagement therewith, said first gear having teeth for engaging corresponding root portions in said second gear, said first and second gears defining pitch circles about their centers of rotation, each of said teeth having active faces defined by first circular arcs, the centers of curvature of said first arcs being on the pitch circle of said first gear, said active faces intersecting the pitch circle of said first gear to define an angle of slew such that the angle of slew ($\alpha$) is a function of the radius (r) of the first gear pitch circle divided by the radius (R) of the second gear pitch circle.

2. A gear assembly according to claim 1, wherein the $\sin \alpha$ is substantially equal to $(1 - r/R)$.

3. A pinion gear assembly according to claim 2, wherein the radii of curvature of said first arcs are defined by $$r = r' \cdot (1 - r/R),$$

and said root portions of said second gear are defined by second circular arcs having radii of curvature defined by $$R = R^1 \cdot (1 - r/R)$$

wherein
$r^1 = r$ and $R^1 = R$ for a spur gear assembly, and $$r^1 = a \cdot \left(\frac{\sin \theta}{1 - \cos \theta}\right),$$
$$R^1 = b \cdot \left(\frac{\sin \theta}{1 - \cos \theta}\right) \text{ for}$$

a wobble gear assembly, wherein
a = radius of first gear at point of cutting of a given gear tooth,
b = radius of second gear at the root portion corresponding to the given gear tooth, and
$\cos \theta = r/R$.

4. A gear assembly comprising a first gear and a second gear in meshed engagement therewith, said first gear having teeth for engaging corresponding root portions in said second gear, said first and second gears defining pitch circles about their centers of rotation, each of said teeth having flat active faces which intersect the pitch circle of said first gear to define an angle of slew such that the angle of slew ($\alpha$) is a function of the radius (r) of the first gear pitch circle divided by the radius (R) of the second gear pitch circle the width in profile of the tip of each tooth being not less than $$r^1 \cdot (1 - r/R^2)$$

and the width in profile of the base of each tooth being not less than $$R^1 \cdot (1 - r/R^2)$$

wherein $r^1 = r$ and $R^1 = R$ for a spur gear assembly, and $$r^1 = a \cdot \left(\frac{\sin \theta}{1 - \cos \theta}\right),$$
$$R^1 = b \cdot \left(\frac{\sin \theta}{1 - \cos \theta}\right) \text{ for a}$$

wobble gear assembly,
wherein
a = radius of first gear at point of cutting of a given gear tooth,
b = radius of second gear at the root portion corresponding to the given gear tooth, and
$\cos \theta = r/R$.

5. A pinion gear assembly according to claim 4, wherein the depth of each said tooth is defined by
depth $= R^1 \cdot (1 - \cos \theta \cdot \cos \alpha - \sin \theta \cdot \sin \alpha)$.

* * * * *